US007434369B2

(12) United States Patent
Uneyama et al.

(10) Patent No.: US 7,434,369 B2

(45) Date of Patent: Oct. 14, 2008

(54) GUILLOTINE CUTTER AND TAPE AFFIXING APPARATUS

(75) Inventors: Noriaki Uneyama, Shizuoka-ken (JP); Hiroyuki Oohara, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/318,929

(22) Filed: Dec. 28, 2005

(65) Prior Publication Data

US 2006/0137827 A1 Jun. 29, 2006

(30) Foreign Application Priority Data

Dec. 28, 2004 (JP) ............................. 2004-381978

(51) Int. Cl.

*B65B 51/06* (2006.01)
*B65B 61/00* (2006.01)
*B26D 1/08* (2006.01)
*B32B 38/00* (2006.01)

(52) U.S. Cl. ....................... 53/136.3; 53/389.3; 83/694; 156/510

(58) Field of Classification Search ................ 53/135.1, 53/136.1-136.5, 389.3; 83/694; 156/510
See application file for complete search history.

(56) References Cited

U.S. PATENT DOCUMENTS 1,798,106 A * 3/1931 Pels ............................ 83/694
3,237,370 A * 3/1966 Ouellette .................. 53/136.4
3,793,919 A * 2/1974 Lefebvre ..................... 83/694
3,962,939 A * 6/1976 Stengle, Jr. .................... 83/51
4,101,369 A * 7/1978 Adams ...................... 156/510
4,347,724 A * 9/1982 Brown et al. .................. 72/203
4,729,272 A * 3/1988 Clement ...................... 83/202
4,889,581 A * 12/1989 Ulrich et al. ............... 53/133.3
5,735,101 A * 4/1998 Shing-Tak Lam .......... 53/136.1

FOREIGN PATENT DOCUMENTS

EP 558122 A1 * 9/1993
JP 2004-937 A * 1/2004

* cited by examiner

*Primary Examiner*—Stephen F Gerrity
(74) *Attorney, Agent, or Firm*—Sughrue Mion, PLLC

(57) ABSTRACT

The guillotine cutter of the present invention has a fixed blade and a movable blade that moves back and forth along a straight line while contacting against the fixed blade, and the movable blade and the fixed blade cooperate to cut a tape-shaped object for cutting in a widthwise direction. In addition, a surface of the fixed blade at a side that contacts the movable blade and a surface of the movable blade at a side that contacts the fixed blade are provided with a recess portion which is a concave portion that is wider than the object for cutting.

40 Claims, 13 Drawing Sheets

GUILLOTINE CUTTER AND TAPE AFFIXING APPARATUS

BACKGROUND OF THE INVENTION

1. Field of the Invention

The present invention relates to a guillotine cutter and tape affixing apparatus and more particularly to a guillotine cutter capable of cutting adhesive tape smoothly and continuously without any adhesive agent from the adhesive tape adhering to the blade tip thereof, and to a tape affixing apparatus having the guillotine cutter.

2. Description of the Related Art

A planographic printing plate bundle in which a predetermined number of planographic printing plates are accumulated in the thickness direction is usually packed with a light shielding/moisture-proof paper, and a method of then affixing joints of the light shielding/moisture-proof paper with adhesive tape in order to prevent light or air from entering from outside has been widely used.

In recent years, the affixing of the tape has often been carried out with an automatic tape affixing apparatus. Conventionally, the automatic tape affixing apparatus comprises a cutter for cutting the adhesive tape to a predetermined length and an affixing roller which rolls along the surface of the planographic printing plate bundle for affixing the adhesive tape cut with the cutter. As the aforementioned cutter, a guillotine cutter comprising a movable blade and a fixed blade has been widely used.

However, in the conventional guillotine cutter, adhesive agent from the adhesive tape adheres to a blade face of the movable blade because the blade face of the movable blade makes contact with a cut edge of the adhesive tape after the adhesive tape is cut. Then, when the movable blade and fixed blade make contact with each other, this adhesive agent is pushed around such that a gap is generated between the movable blade and the fixed blade, which gives rise to cutting failure whereby the adhesive tape is not cut properly.

Further, feeding failure occurs whereby remaining adhesive tape after cutting adheres to adhesive agent left on the blade faces of the movable blade and fixed blade so that the adhesive tape is not fed properly when a feeding operation is carried out.

Recently, an adhesive agent sticking prevention apparatus in which an adhesive agent sticking prevention agent such as silicone oil is applied to the cutter blade of an adhesive tape affixing machine has been proposed in a prior document (Japanese Patent Application Laid-Open (JP-A) No. 2004-000937).

However, the adhesive agent sticking prevention apparatus described in the prior document is intended for a rotary cutter having a rotary blade which cuts by rotating from a non-adhesive face of the adhesive tape toward its adhesive face, and the adhesive tape is prevented from adhering to the blade by contacting a contact member, which is structured so that it exudes sticking prevention agent onto an outer face thereof, against the rotary blade, which rotates in a specified direction, to thus coat the blade with the sticking prevention agent.

However, the adhering agent sticking prevention apparatus is considered to be unsuitable for a guillotine cutter because the movable blade of guillotine cutter moves linearly with respect to the fixed blade without rotating, unlike the rotary cutter.

Therefore, in order to effectively prevent reduction of cutting performance due to adhesion and deposit of the adhesive agent of the adhesive tape on the blade face and clogging of the adhesive tape in the guillotine cutter, so as to enable adhesive tape to be cut smoothly even after it is cut plural times, a new adhesive agent sticking prevention mechanism, different from the adhesive agent sticking prevention apparatus described in the above document, is required.

SUMMARY OF THE INVENTION

The present invention has been achieved in view of the above-described situation and an object of the invention is to provide a guillotine cutter including a fixed blade and a movable blade making linear reciprocating motion while contacting the fixed blade, in which the movable blade cooperates with the fixed blade to cut a tape-like object for cutting in a widthwise direction, and in which a surface of the fixed blade that contacts the movable blade and a surface of the movable blade that contacts the fixed blade are each provided with a recess portion which is a concave portion wider than the object for cutting.

DESCRIPTION OF THE PREFERRED EMBODIMENTS

1. First Embodiment

An embodiment of the tape affixing apparatus of the present invention will be described below.

Figure 1:
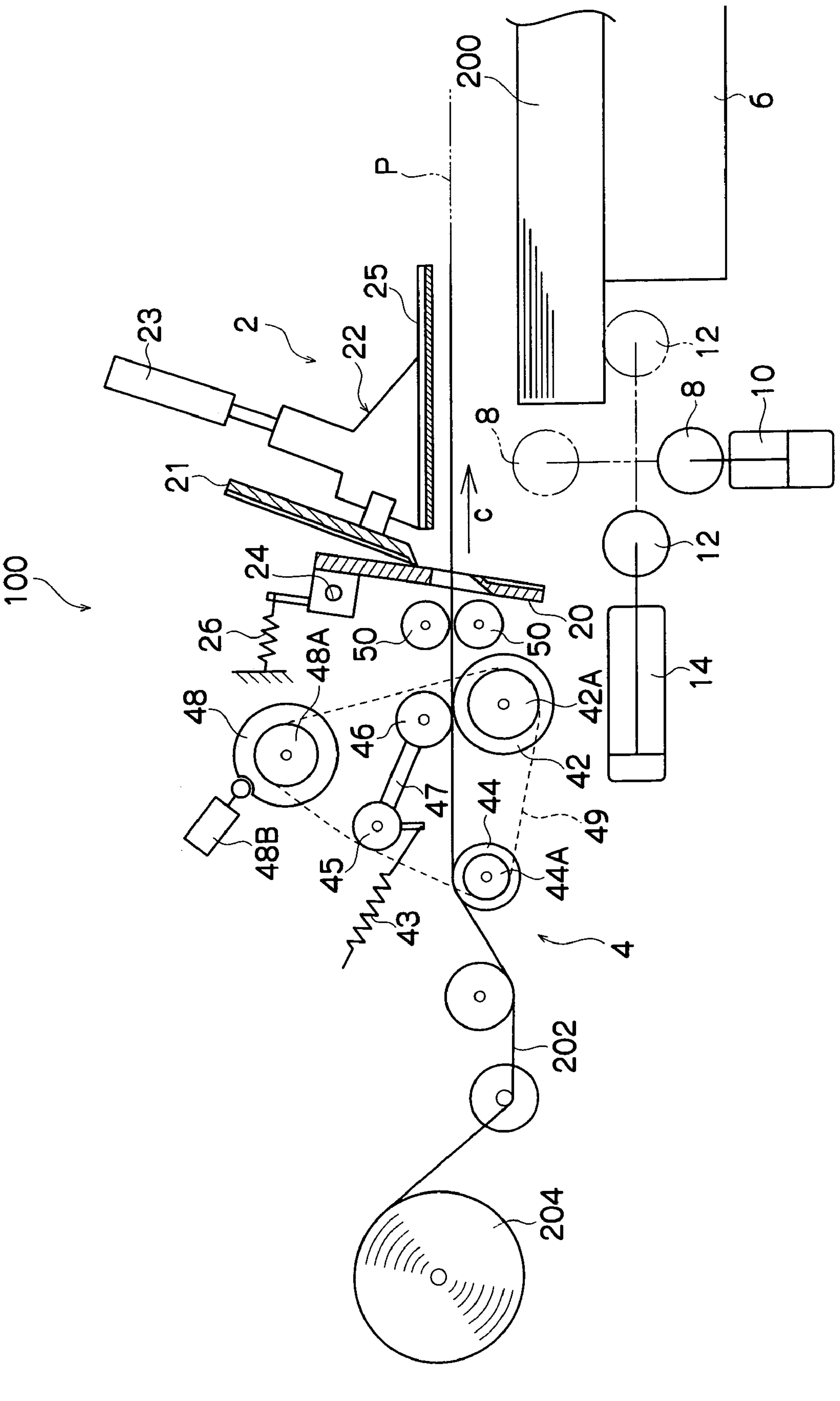
FIG. 1 is a schematic diagram showing the structure of a tape affixing apparatus according to a first embodiment.

As shown in FIG. 1, the tape affixing apparatus 100 of the first embodiment comprises a guillotine cutter 2 for cutting an adhesive tape 202 to a predetermined length; an adhesive tape feeding portion 4 for winding off adhesive tape 202 from an adhesive tape roll 204 and feeding it to the guillotine cutter 2; a table 6 which is located below the guillotine cutter 2 and on which a planographic printing plate bundle 200, including a predetermined quantity of planographic printing plates laminated in a thickness direction and packaged with a light shielding/moisture proof paper, is placed; a draw roller 8 which is raised and lowered by a cylinder 10 in order to receive an end of the adhesive tape 202, the other end of which is pasted to the top face of the planographic printing plate bundle 200, and pull it downward along a side face of the planographic printing plate bundle 200; and a wrap-around roller 12 which advances/retracts with respect to the table 6 and wraps the adhesive tape 202, pulled downward by the draw roller 8, on a side face and the bottom face of the planographic printing plate bundle 200 thus affixing it. The adhesive tape feeding portion 4 corresponds to an adhesive tape feeding device in the tape affixing apparatus of the invention, and the draw roller 8, the cylinder 10, the wrap-around roller 12 and the cylinder 14 correspond to a tape affixing device in the tape affixing apparatus and at the same time, corresponds to a tape wrap-around portion in the tape affixing apparatus.

Figure 2:
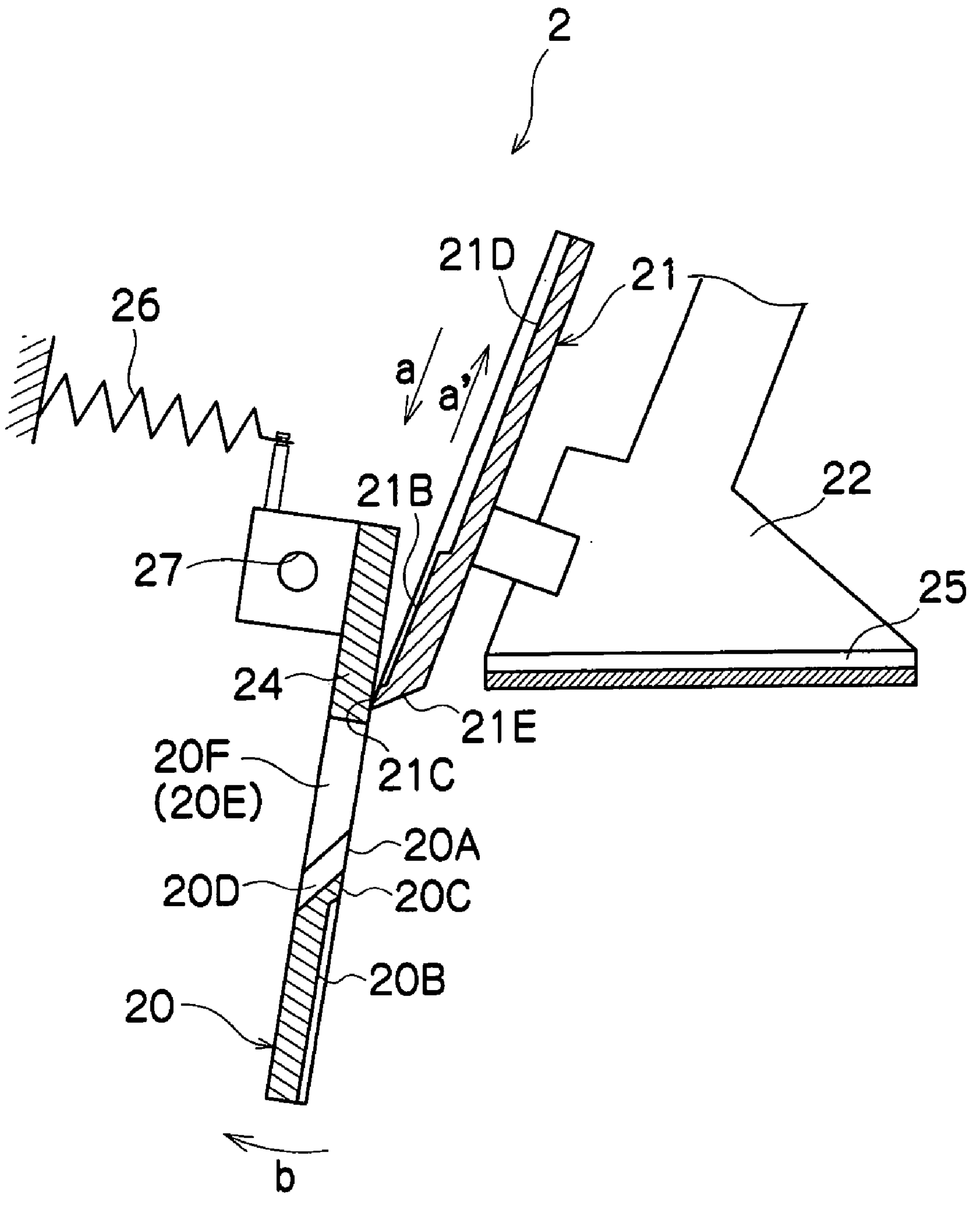
FIG. 2 is an enlarged view showing the structure of a guillotine cutter provided on the tape affixing apparatus shown in FIG. 1.
Figure 3A:
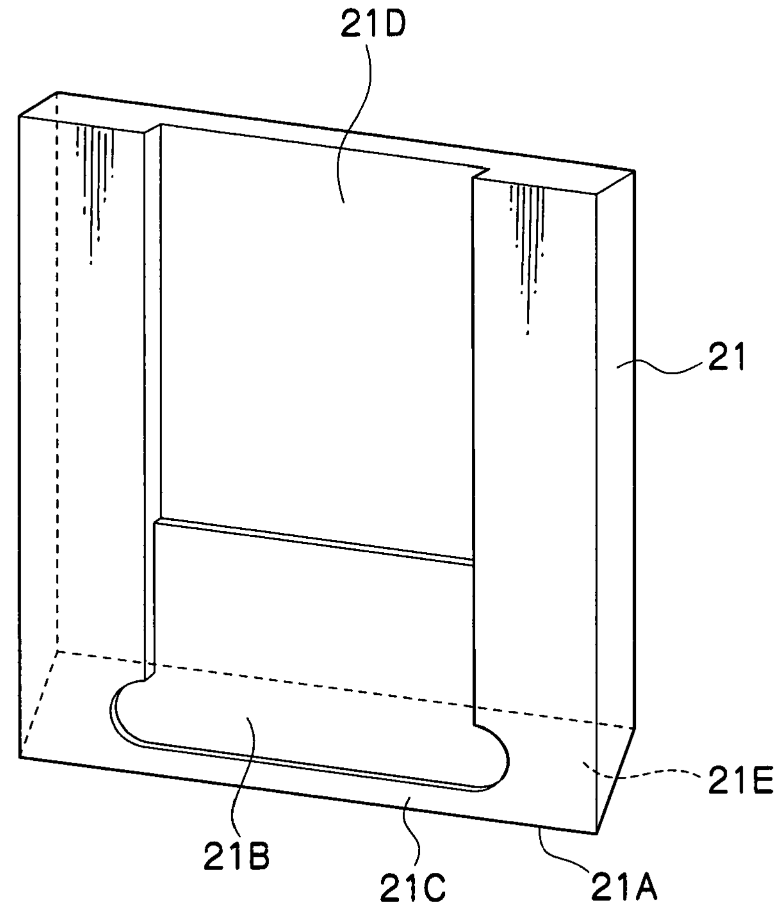
FIGS. 3A, 3B are perspective views showing the detail of an upper blade and a lower blade of the guillotine cutter shown in FIG. 2.
Figure 3B:
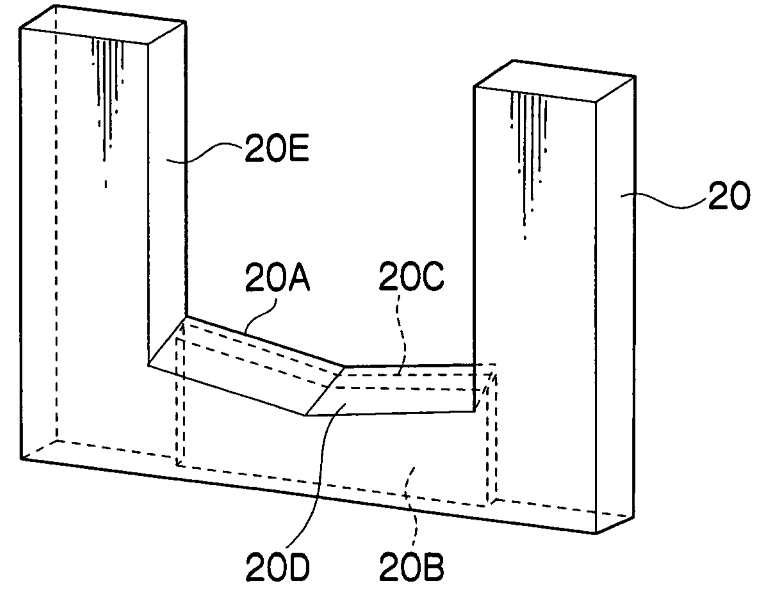

As shown in FIGS. 1, 2, the guillotine cutter 2 comprises a lower blade 20, an upper blade 21 and a pedestal 22 which holds the upper blade 21 and moves it along the lower blade 20 in both directions as indicated by Arrow ‘a’ in FIG. 2. The lower blade 20 and upper blade 21 correspond to a fixed blade and movable blade in the guillotine cutter of the invention.

The lower blade 20 is mounted on a holder 24 that is swingable around a shaft 27 which is perpendicular to the direction of movement of the upper blade 21. Because the holder 24 is urged to rotate in the opposite direction to the direction indicated by Arrow ‘b’ in FIG. 2 by a spring 26, the lower blade 20 is always kept in contact with a blade tip 21A regardless of the position of the upper blade 21.

The pedestal portion 22 is provided with a suction portion 25 for holding by suction the adhesive tape 202 cut by the upper blade 21 and lower blade 20, and is moved up and down or reciprocated along the directions indicated by Arrows ‘a’ and ‘a'’ by a cylinder 23. The range of the reciprocation of the pedestal portion 22 is set so that the adhesive tape 202 is cut by the upper blade 21 and the lower blade 20 and when it is lowered to the bottom, the suction portion 25 makes contact with the planographic printing plate bundle 200 placed on the table 6.

As the pedestal portion 22 is lowered, the upper blade 21 is also lowered together therewith and the lower blade 20 is pressed by the blade tip 21A of the upper blade 21 so that it swings in the direction of Arrow ‘b’ against an urging force from the spring 26. On the other hand, if the pedestal portion 22 is raised, the upper blade 21 is also raised together therewith so that the lower blade 20 is swung in an opposite direction to the Arrow ‘b’ around the shaft 27 by the urging force from the spring 26. As a consequence, the upper blade 21 moves up and down with at least the blade tip 21A making contact with the lower blade 20.

The suction portion 25 corresponds to a tape end affixing portion in the tape affixing apparatus of the invention.

As shown in FIG. 1, the adhesive tape feeding portion 4 comprises a feeding roller 42 located below a conveying path P of the adhesive tape 202, a feeding roller 44 located upstream of the feeding roller 42 with respect to the feeding direction ‘c’ of the adhesive tape 202, a nipping roller 46 located opposite to the feeding roller 42 across the conveying path P for nipping the adhesive tape 202 together with the feeding roller 42, a drive motor 48 located above the nipping roller 46 for driving the feeding roller 42 and the feeding roller 44 and a pair of holding rollers 50 located between the feeding roller 42 and the nipping roller 46 and the lower blade 20 of the guillotine cutter 2 for holding the adhesive tape 202 fed by the feeding roller 42 and the nipping roller 46 so that it is fed properly into the guillotine cutter 2.

A drive pulley 48A is fixed to the rotation shaft of the drive motor 48 and likewise, a driven pulley 42A and a driven pulley 44A are fixed to the feeding roller 42 and the feeding roller 44 respectively. A belt 49 is wound around the drive pulley 48A, the driven pulley 42A and the driven pulley 44A, so that a rotation of the drive motor 48 is transmitted to the feeding roller 42 and the feeding roller 44 via the belt 49. The diameters of the drive pulley 42A and the driven pulley 44A are controlled so that the peripheral velocities of the feeding roller 42 and the feeding roller 44 are equal. In the meantime, a tachometer 48B for detecting a number of revolutions is provided on the drive motor 48.

The nipping roller 46 is mounted on a front end of an arm 47 that is swingable around a shaft 45. The arm 47 is urged by a spring 43 in a direction in which it rotates toward the feeding roller 42 and, therefore, the nipping roller 46 is urged against the feeding roller 42.

The surfaces of the feeding roller 42, the feeding roller 44 and the holding roller 50 are coated with a fluorine resin such as polytetrafluoroethylene resin, vinylidene fluoride ethylene copolymer resin, and tetrafluoroethylene hexafluoro propylene copolymer resin or a low friction material such as ultra-high molecular weight polyethylene, to prevent the adhesive agent from adhering thereto, because the respective surfaces make contact with the adhesive face of the adhesive tape 202.

Hereinafter, the upper blade 21 and the lower blade 20 of the guillotine cutter 2 will be described.

As shown in FIGS. 2, 3A, 3B, and 4A-4C, the upper blade 21 is formed into a plate having as a whole a rectangular planar shape and the surface on the side making contact with the lower blade 20 is finished with a planar configuration while the blade tip 21A is formed on the bottom of this surface. An inclined plane, which is inclined toward the blade tip 21A, or a swagging face 21E is formed on the opposite side of the blade tip 21A. Therefore, the bottom end portion of the upper blade 21 is formed in the form of a wedge whose thickness decreases as it goes toward the blade tip 21A.

A recess portion 21B, which is a substantially rectangular concave portion wider than the adhesive tape 202 to be cut is provided from the vicinity of the blade tip 21A of the upper blade 21 toward the base of the blade tip 21A. The bottom end portion of the recess portion 21B shown in FIGS. 3 and 4 is chamfered into a semi-circular shape for reasons related to production. The recess portion 21B communicates with a concave portion 21D formed in the root portion of the upper blade 21.

Figure 4C:
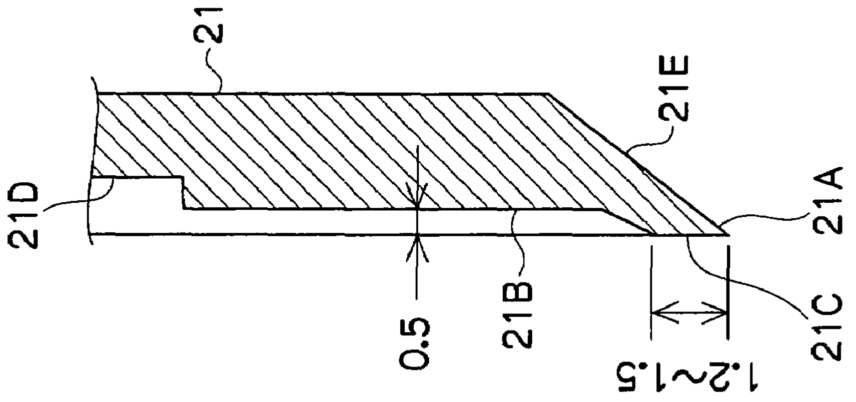
FIG. 4C is an enlarged view showing the structure of the blade tip of the upper blade and the surrounding structure.
Figure 4B:
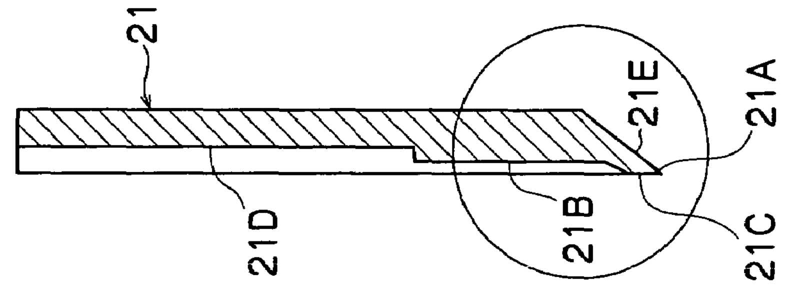
FIG. 4B is a sectional view showing a cross-section of the upper blade along a plane perpendicular to the plan view in FIG. 4A.
Figure 4A:
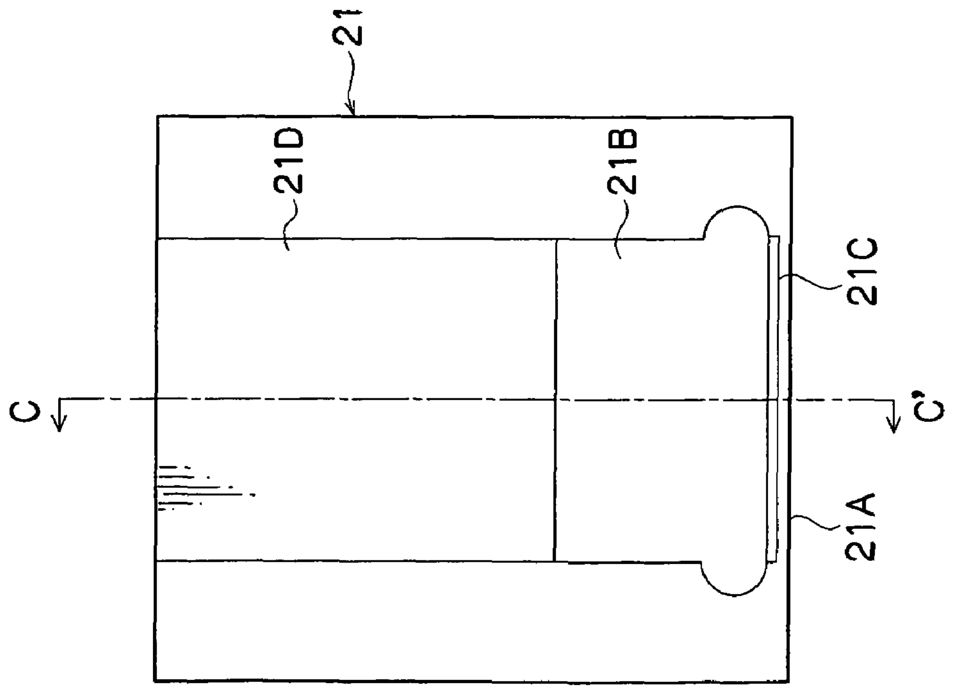
FIG. 4A is a plan view of the upper blade of the guillotine cutter shown in FIG. 2 as seen from a side at which it makes contact with the lower blade.

As shown in FIGS. 4B, 4C, the depth of the recess portion 21B is 0.5 mm or more. Further, the width of a blade tip front end face 21C that contributes to the cutting of the adhesive tape 202 from the blade tip 21A to the recess portion 21B is in a range of 1.2 to 1.5 mm.

If the depth of the recess portion 21B in the upper blade 21 is 0.5 mm or more, the cross section of the cut adhesive tape 202 makes contact with no portion of the upper blade 21 other than the blade tip front end face 21C and therefore, no adhesive agent adheres to any portion other than the blade tip front end face 21C. If the width of the blade tip front end face 21C is in the range of 1.2 to 1.5 mm, even if adhesive agent from the adhesive tape 202 adheres to the blade tip front end face 21C, no large amount of adhesive agent adheres to the upper blade 21 and the lower blade 20 because the amount of adhering agent that adheres to the blade tip front end face 21C is extremely small.

As shown in FIGS. 2, 3A, 3B, 5A-5C, the lower blade 20 is plate-shaped and an opening portion 20E, which is open to an ascent direction 'a'' in which the upper blade 21 ascends, is provided, and a shallow V-shaped blade tip 20A is formed at a lower surface of the opening portion 20E. A surface at the side making contact with the upper blade 21 is finished in the form of plane and at the opposite side of the blade tip 20A an inclined face which is inclined toward the blade tip 20A, or a swagging face 20D, is formed. With the lower blade 20 mounted at the holder 24, a substantially rectangular opening portion 20F through which the adhesive tape passes is formed by the opening portion 20E and the holder 24 as shown in FIGS. 2 and 12.

A recess portion 20B, which is a substantially rectangular concave portion wider than the adhesive tape 202, is provided adjacent to the blade tip 20A at a face of the lower blade 20 which makes contact with the upper blade 21.

Figure 5C:
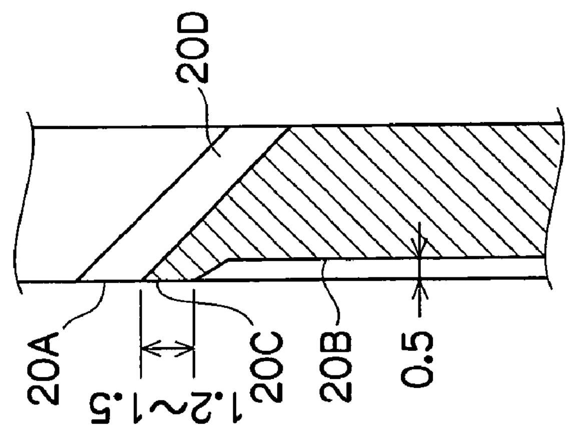
FIG. 5C is an enlarged view showing the structure of the blade tip of the lower blade and the surrounding structure.
Figure 5B:
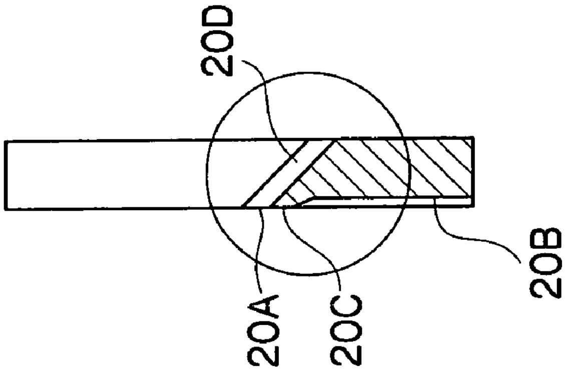
FIG. 5B is a sectional view showing a cross-section of the lower blade along a plane D-D' perpendicular to the plan view in FIG. 5A.
Figure 5A:
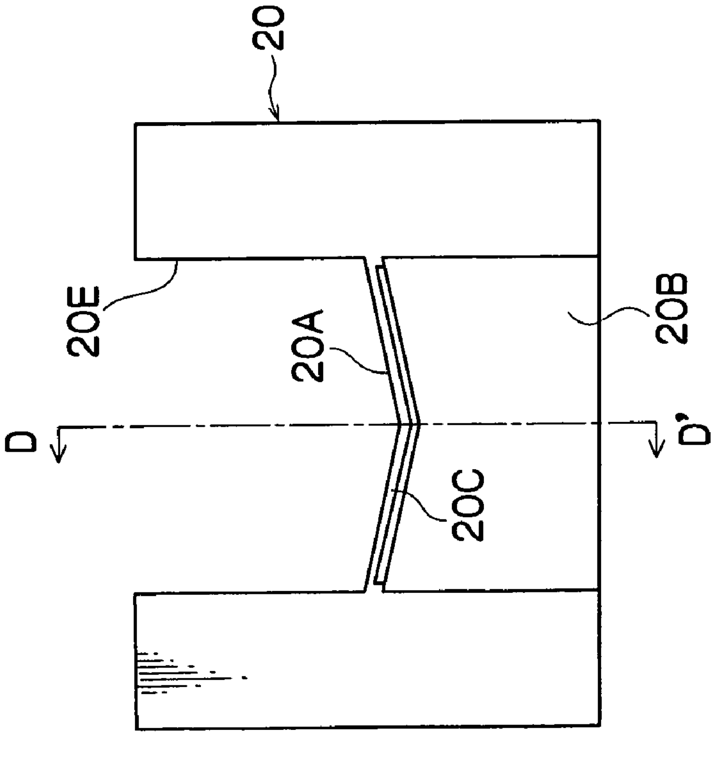
FIG. 5A is a plan view of the lower blade of the guillotine cutter shown in FIG. 2 as seen from a side at which it makes contact with the upper blade.

As shown in FIGS. 5B, 5C, the depth of the recess portion 20B is 0.5 mm or more, as with the upper blade 21. The width of the blade tip front end face 20C, that contributes to cutting of the adhesive tape 202, from the blade tip 20A to the recess portion 20B is in a range of 1.2 to 1.5 mm.

If the depth of the recess portion 20B in the lower blade 20 is 0.5 mm or more, the section of the cut adhesive tape 202 contacts no portion of the lower blade 20 other than the blade tip front end face 20C and, therefore, no adhesive agent adheres to any portion other than the blade tip front end face 20C. If the width of the blade tip front end face 20C is in the range of 1.2 to 1.5 mm, even if adhesive agent of the adhesive tape 202 adheres to the blade tip front end face 20C, as in the case of the upper blade 21, a large amount of adhesive agent does not adhere to the upper blade 21 or the lower blade 20 because the amount of adhering agent is extremely small.

Figure 6:
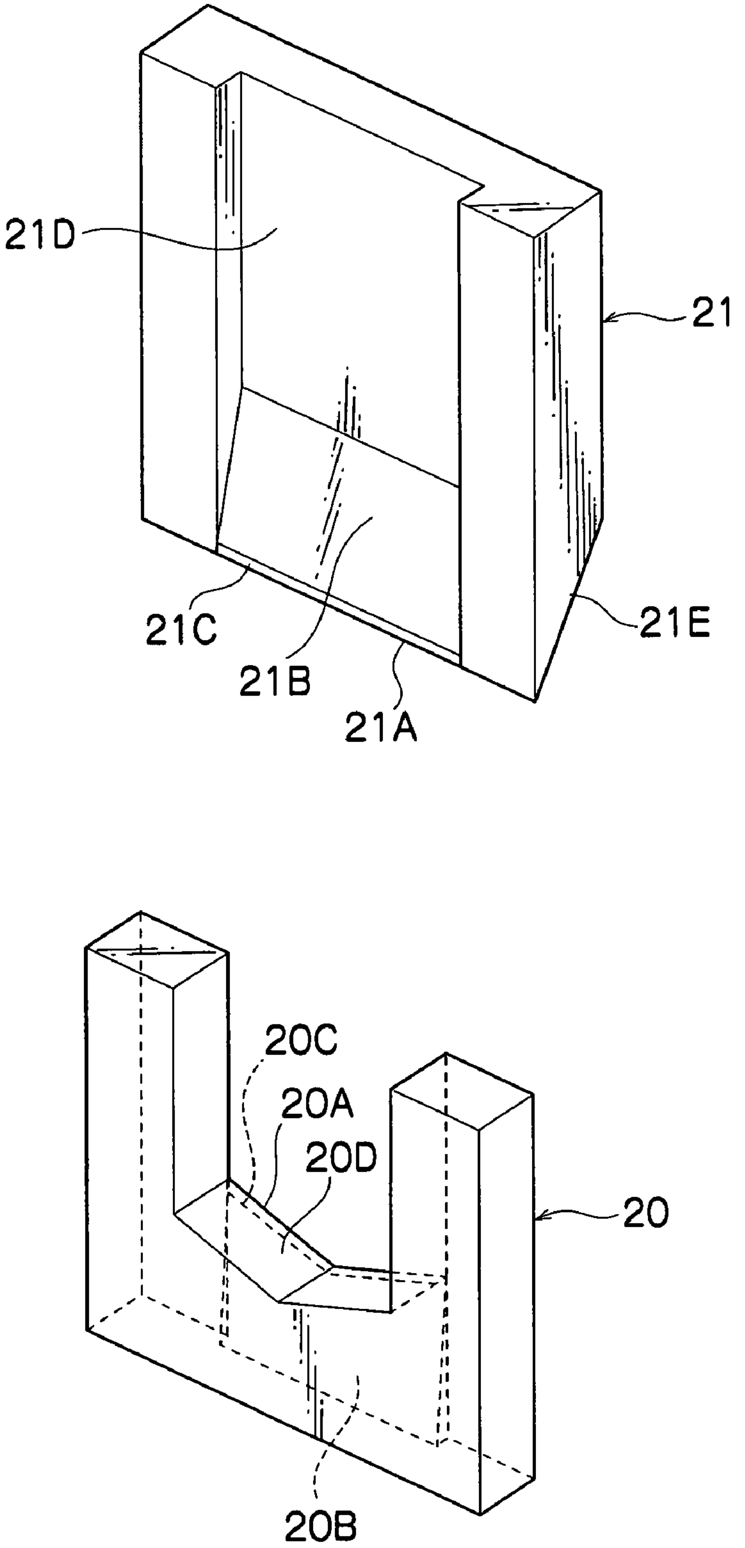
FIG. 6 is a perspective view showing another example of the upper blade and lower blade of the guillotine cutter shown in FIG. 2.
Figure 7:
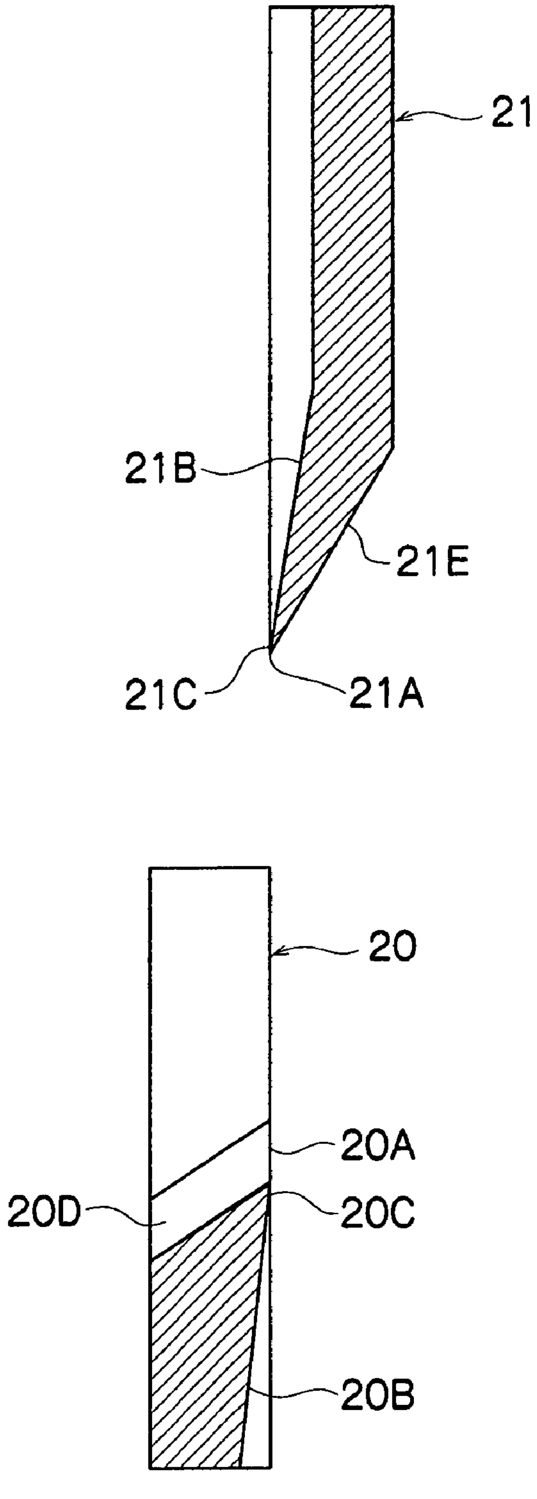
FIG. 7 is a sectional view of the upper blade and lower blade shown in FIG. 6.

In the upper blade 21 and the lower blade 20, as shown in FIGS. 6, 7, the recess portion 21B and the recess portion 20B may be formed in the form of a slope so that the depth increases as it leaves the blade tip 21A or the blade tip 20A. In this case, the depth of a portion 20 mm apart from the blade tip 21A or the blade tip 20A is preferred to be 0.5 mm or more. Further, the width of the blade tip front end face 21C and the blade tip front end face 20C is preferred to be 0.5 mm or less.

Figure 8B:
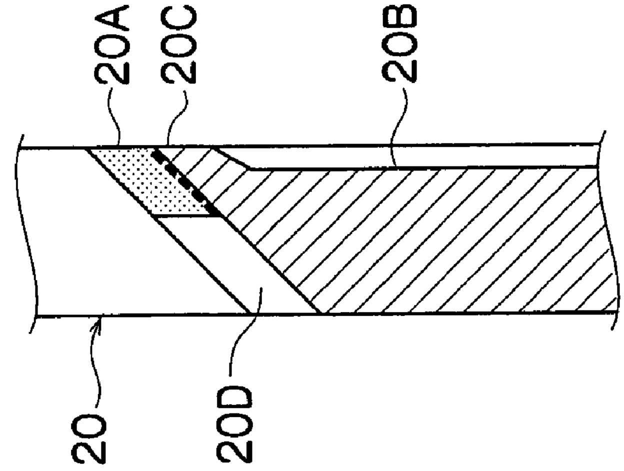
FIG. 8B is a sectional view thereof.
Figure 8A:
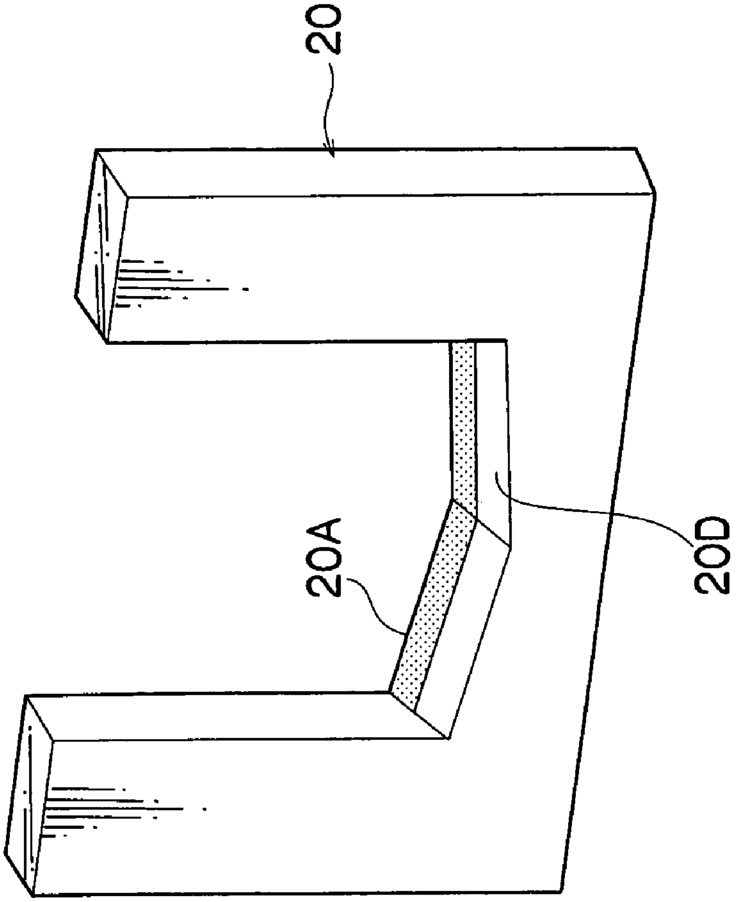
FIG. 8A is a perspective view showing yet another example of a lower blade of the guillotine cutter shown in FIG. 2

Further, the lower blade 20 is preferably coated with low friction coating from the blade tip 20A across the swagging face 20D as indicated with a dotted area in FIGS. 8A, 8B. Examples of the material that can be used as the low friction coating include fluorine resin or ultrahigh molecular weight polyethylene which are mentioned as low friction materials with respect to the feeding roller 42, the feeding roller 44 and the holding roller 50 in the adhesive tape feeding portion 4.

Hereinafter, the operation of the tape affixing apparatus 100 will be described.

Figure 9A:
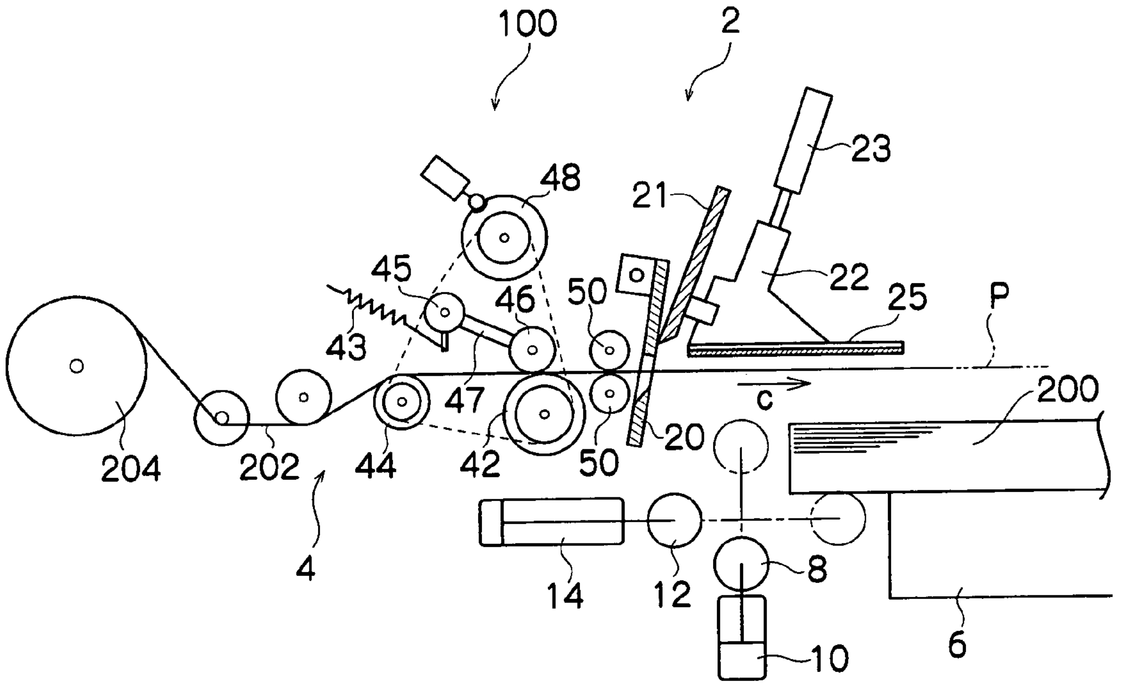
FIGS. 9A, 9B are diagrams showing the operation process of the tape affixing apparatus shown in FIG. 1.

As shown in FIG. 9A, first, the adhesive tape 202 is fed out from an adhesive tape roll 204 to the guillotine cutter 2 along a feeding direction 'c' by the adhesive tape feeding portion 4.

Figure 9B:
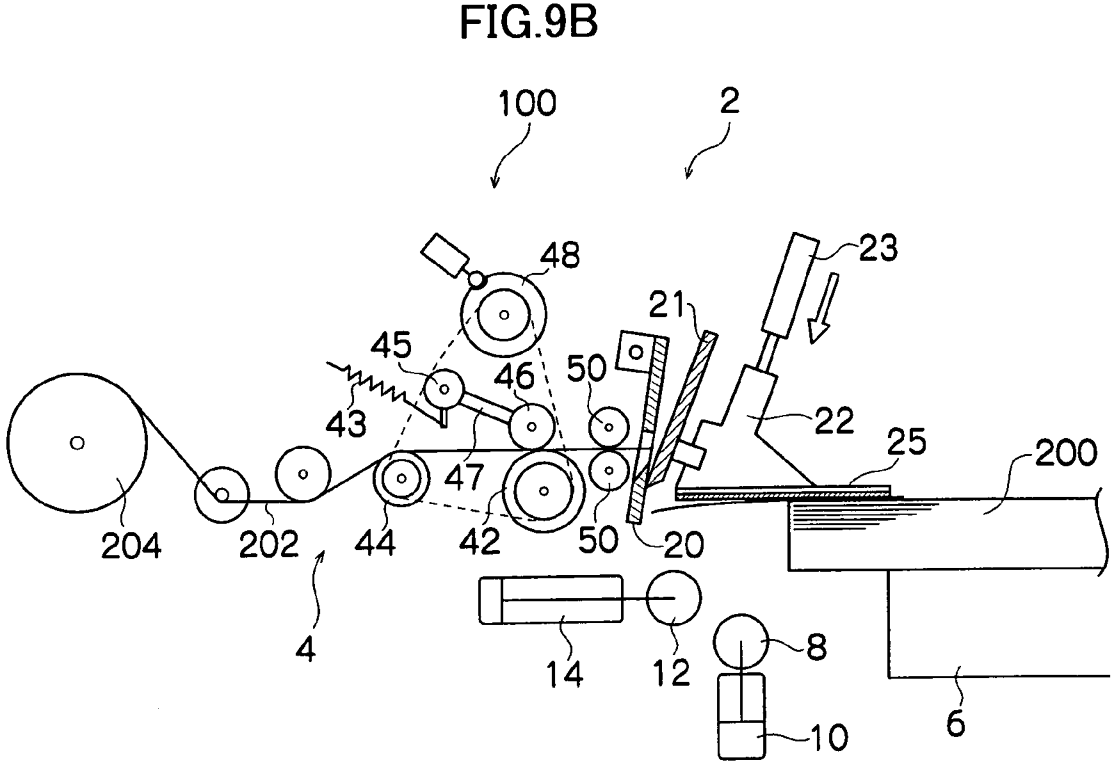

When the adhesive tape 202 is fed by a predetermined length, the adhesive tape 202 is cut by the guillotine cutter 2 as shown in FIG. 9B and then an end of the cut adhesive tape 202 is pasted to the top face of the planographic printing plate bundle 200.

A process for cutting the adhesive tape 202 with the guillotine cutter 2 will be described with reference to FIGS. 11, 12.

Figure 11A:
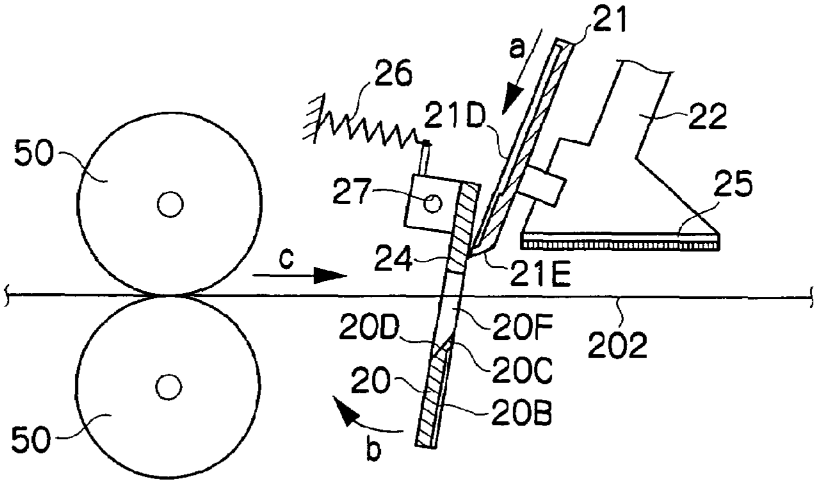
FIGS. 11A-11C are diagrams showing the operation process of cutting the adhesive tape with the guillotine cutter of the tape affixing apparatus shown in FIG. 1.
Figure 12A:
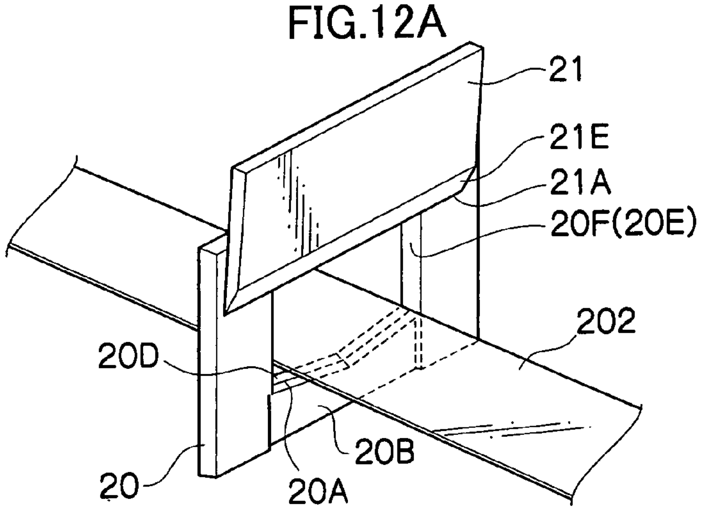
FIGS. 12A-12C are diagrams showing the operation process of cutting the adhesive tape with the guillotine cutter of the tape affixing apparatus shown in FIG. 1.

As shown in FIGS. 11A, 12A, the adhesive tape 202, after being fed from the adhesive tape reel 204, passes through an opening portion 20F of the lower blade 20 from a side provided with the swagging face 20D along a direction of Arrow 'c' and arrives below the suction portion 25.

Figure 11B:
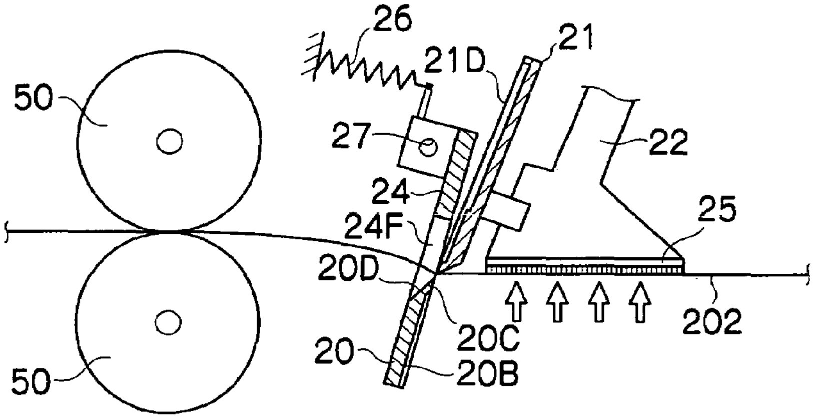
Figure 11C:
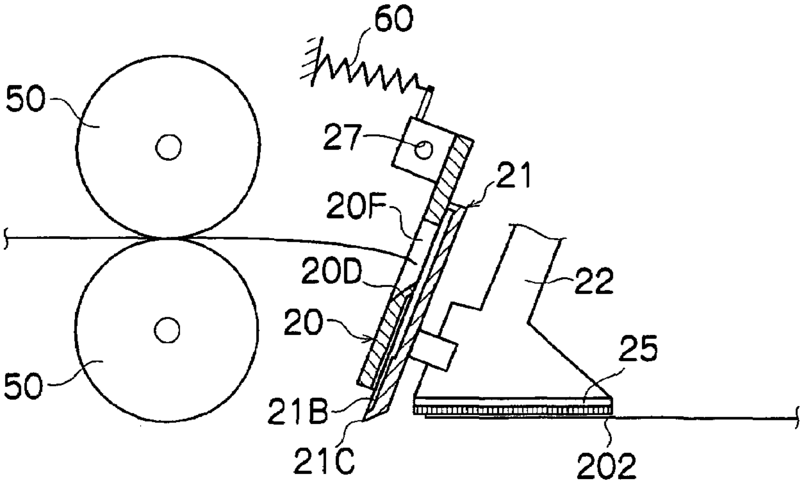
Figure 12B:
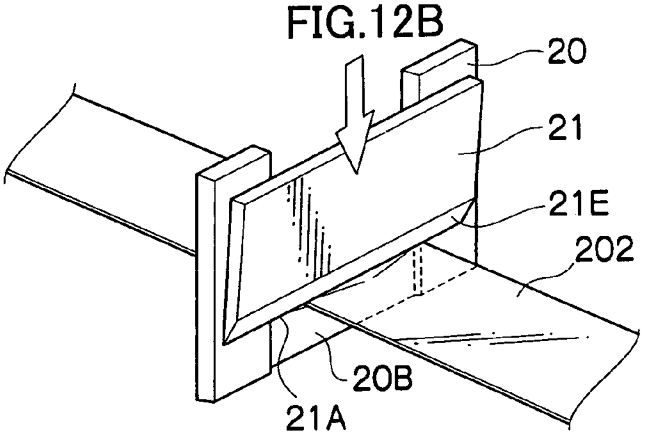
Figure 12C:
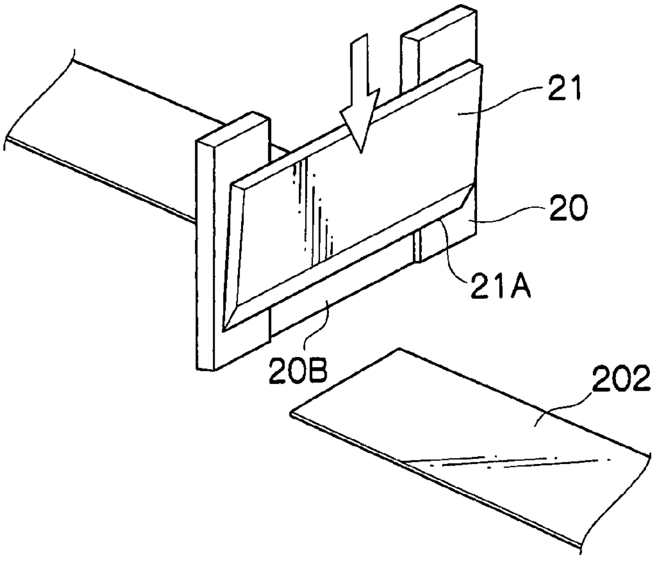

When feeding of the adhesive tape 202 is stopped, the upper blade 21 descends toward the lower blade 20 along the direction of Arrow 'a' as shown in FIGS. 11B, 12B and the adhesive tape 202 is cut and the cut adhesive tape 202 is suctioned by the suction portion 25. Then, as the pedestal portion 22 descends toward the planographic printing plate bundle 200 as shown in FIGS. 11C, 12C, the adhesive tape 202 suctioned by the suction portion 25 is pasted to the planographic printing plate bundle 200.

Figure 10A:
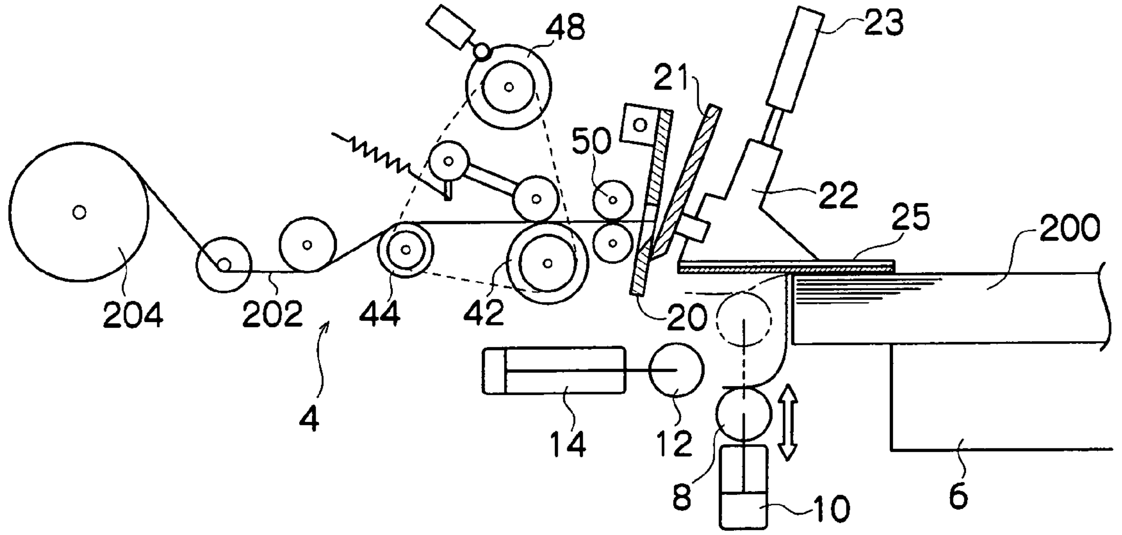
FIGS. 10A, 10B are diagrams showing the operation process of the tape affixing apparatus shown in FIG. 1.
Figure 10B:
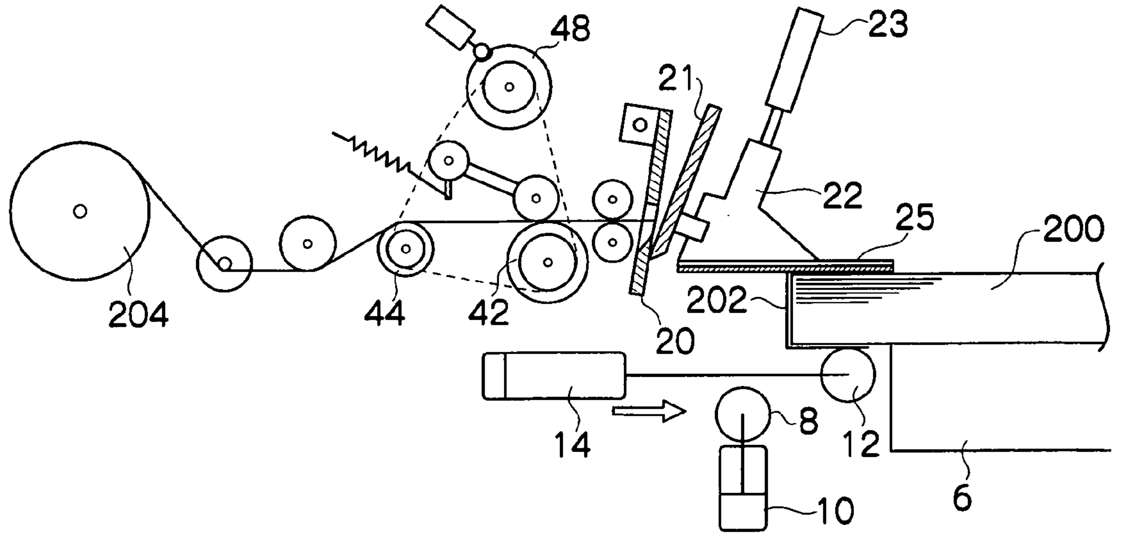

When an end of the cut adhesive tape 202 is adhered to the top face of the planographic printing plate bundle 200, the cylinder 10 is extended so that the draw roller 8 rises as shown in FIG. 10A. After the draw roller 8 sticks to the other end of the adhesive tape 202, the cylinder 10 is contracted as shown in FIG. 10B and then the draw roller 8 is lowered, so that the other end of the adhesive tape 202 is pulled downward along the side face of the planographic printing plate bundle 200.

After the other end of the adhesive tape is pulled downward, the cylinder 14 is extended and the wrap-around roller 12 advances to the table 6, so that the adhesive tape 202 is wrapped around the top face, the side face and the bottom face of the planographic printing plate bundle 200.

Figure 13:
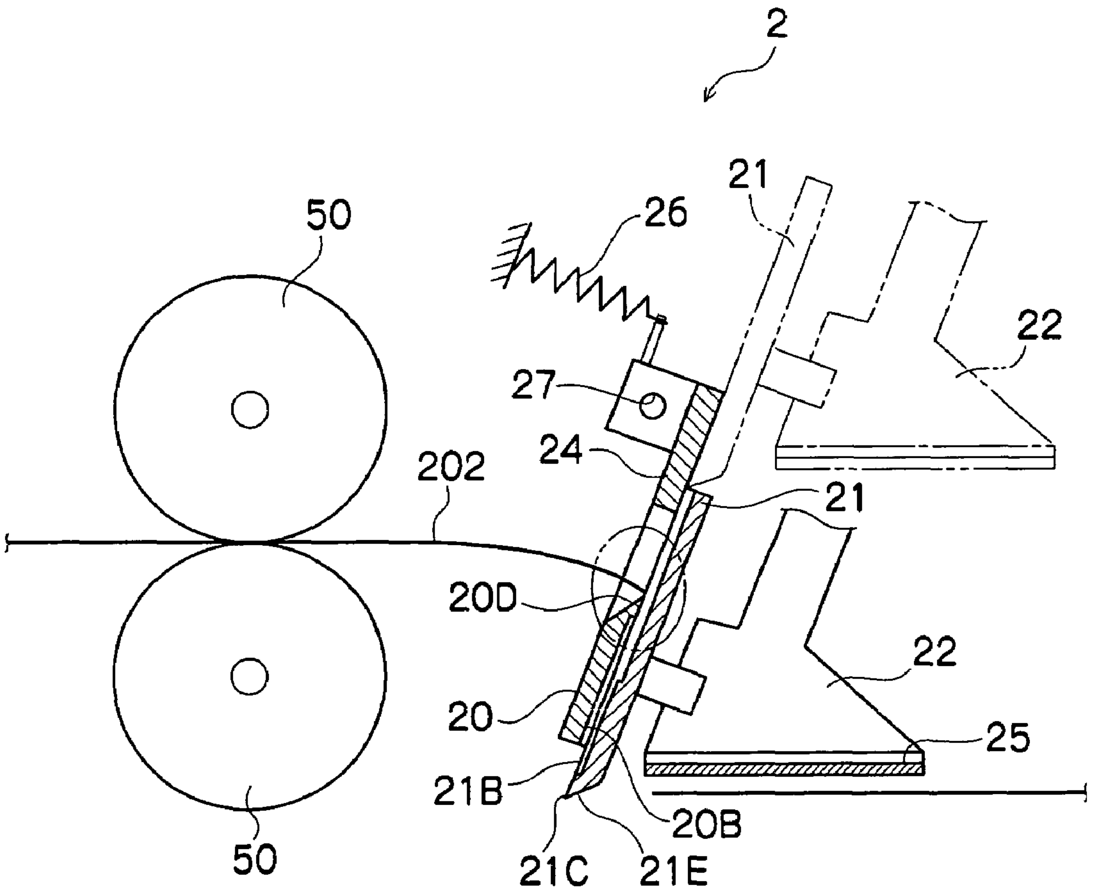
FIG. 13 is an explanatory diagram of the effect exerted by the tape affixing apparatus shown in FIG. 1.

In the tape affixing apparatus 100, since the upper blade 21, which is a component part of the guillotine cutter 2, is provided with the recess portion 21B, as shown in FIG. 13, when the upper blade 21 descends and the adhesive tape 202 is cut, a remaining end face of the cut adhesive tape 202 does not come into contact with the recess portion 21B and the upper blade 21 descends as far as to its lowest point. Therefore, as regards the upper blade 21, adhesive agent only adheres to the blade tip front end face 21C and does not adhere to the greater part of the surface at a side facing the lower blade 20.

Further, because the lower blade 20 is provided with the recess portion 20B, when the upper blade 21 rises after finishing cutting of the adhesive tape 202, adhesive agent adhered to the blade tip front end face 21C does not adhere to the surface of the lower blade 20 at a side facing the upper blade 21.

Thus, because no adhesive agent is deposited on any of the upper blade 21 or the lower blade 20 after the cutting of the adhesive tape 202 is repeated plural times, no gap is generated between the upper blade 21 and the lower blade 20, thereby causing no cutting failure. Further, it never happens that a portion of the adhesive tape 202 cut improperly is torn away and sticks to the blade tip 20A of the lower blade 20 causing feeding failure of the adhesive tape 202.

Further, because a portion of the swagging face 20D of the lower blade 20 near the blade tip 20A is coated with low friction material, no adhesive agent adheres to the swagging face 20D even if the front end of a remaining portion of cut adhesive tape 202 makes contact with the swagging face 20D, and feeding failure of the adhesive tape 202 is thus effectively prevented.

As explained above, in the guillotine cutter of the present invention, because the surface of the movable blade at a side that contacts the fixed blade is provided with a recess portion, when the guillotine cutter is used for cutting the adhesive tape, the movable blade makes contact with a cut end of the adhesive tape only via the blade tip front end face that contributes to cutting and extends from the blade tip to the recess portion, so that the amount of adhesive agent from the adhesive tape that adheres to the movable blade is extremely small.

Further, because the surface of the fixed blade that contacts the movable blade is also provided with a recess portion, adhesive agent sticking to the movable blade is prevented from being spread over and deposited on the fixed blade.

Therefore, generation of cutting failure due to a gap between the movable blade and the fixed blade is effectively prevented and, additionally, occurrence of feeding failure of the adhesive tape due to an improperly cut portion of the adhesive tape being torn away and sticking to the blade tip of the fixed blade is also prevented.

A second aspect of the invention relates to the guillotine cutter of the first aspect in which the swagging face of the fixed blade is coated with a low friction resin.

In the guillotine cutter, a object to be cut such as adhesive tape is usually fed from the fixed cutter to the movable cutter. Therefore, when the adhesive tape is cut, a cut end of the cut adhesive tape comes into contact with the swagging face of the fixed blade, namely, a face on an opposite side to the blade tip front end face.

However, because the swagging face of the fixed blade of the guillotine cutter is coated with a low friction resin, even if the cut end of an adhesive tape remaining after cutting comes into contact with the swagging face of the fixed blade, no adhesive agent sticks to the swagging face.

A third aspect of the invention relates to the guillotine cutter of the first and second aspects, in which the recess portions of the fixed blade and the movable blade have a depth of 0.5 mm or more.

The adhesion of adhesive agent from the adhesive tape to portions of the guillotine cutter other than the blade tips is effectively prevented by making the recess portions of the fixed blade and the movable blade have a depth of 0.5 mm or more.

A fourth aspect of the invention relates to the guillotine cutter of the third aspect in which the width from the blade tip to the recess portion of the blade tip front end faces, which contribute to cutting, of the fixed blade and the movable blade is from 0.5 mm to 1.5 mm.

A fifth aspect of the invention relates to the guillotine cutter of the third aspect in which the width from the blade tip to the recess portion of the blade tip front end faces, which contribute to cutting, of the fixed blade and the movable blade is from 1.2 mm to 1.5 mm.

In these guillotine cutters, since the width of the blade tip front end faces of both the fixed blade and the movable blade is small, the amount of adhesive agent that adheres thereto when ends of the adhesive tape contact the blade tip front end faces is extremely small.

Accordingly, cutting failure and feeding failure of the adhesive tape caused by adhesive agent adhered to the fixed blade and the movable blade is effectively prevented.

On the other hand, since the width of the blade tip front end faces is not excessively small, neither the blade tip of the movable blade nor the blade tip of the fixed blade are chipped as a result of the impact when the respective blade tips contact.

A sixth aspect of the invention relates to a tape affixing apparatus for affixing adhesive tape to a package, which includes a guillotine cutter of any of the first to fifth aspects, adhesive tape feeding device for feeding adhesive tape toward the guillotine cutter, and tape affixing device for affixing adhesive tape that has been cut at the guillotine cutter to the surface of a package.

In the tape affixing apparatus, since there is no occurrence of cutting failure or feeding failure of the adhesive tape at the guillotine cutter, neither is there any occurrence of affixing failure at the tape affixing device caused by cutting failure or feeding failure.

A seventh aspect of the invention relates to a tape affixing apparatus of the sixth aspect, in which the tape affixing device is provided with a tape end affixing portion that presses an end of the adhesive tape cut at the guillotine cutter against the package and affixes it thereto, and a tape wrap-around portion that wraps the adhesive tape, of which one end has been affixed to the package by the tape end affixing portion, around the surface of the package.

According to the tape affixing apparatus, it is extremely easy to affix adhesive tape to the surface of a package.

What is claimed is:

1. A guillotine cutter, comprising a fixed blade and a movable blade that makes linear reciprocal motion while contacting against the fixed blade, wherein the movable blade and the fixed blade cooperate to cut a tape-shaped object for cutting in a widthwise direction, a surface of the fixed blade at a side that contacts the movable blade and a surface of the movable blade at a side that contacts the fixed blade are provided with a recess portion which is a concave portion that is wider than the object for cutting, and the movable blade has a blade tip which is the only cutting edge of the movable blade, and the entire blade tip is straight.

2. The guillotine cutter according to claim 1, wherein a swagging face of the fixed blade is coated with a low resistance coating.

3. The guillotine cutter according to claim 2, wherein the low resistance coating is a fluoroethylene resin or an ultrahigh molecular weight polyethylene coating.

4. The guillotine cutter according to claim 3, wherein the depth of the recess portion of the fixed blade and the movable blade is 0.5 mm or more.

5. The guillotine cutter according to claim 4, wherein, at the fixed blade and at the movable blade, the width from the recess portion to a blade tip of a blade tip front end face that contributes to cutting is from 0.5 mm to 1.5 mm.

6. A tape affixing apparatus that affixes adhesive tape to a package, comprising the guillotine cutter of claim 5, an adhesive tape feeding device that feeds adhesive tape toward the guillotine cutter, and a tape affixing device that affixes an adhesive tape cut by the guillotine cutter to a surface of the package.

7. The tape affixing apparatus according to claim 6, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

8. The guillotine cutter according to claim 4, wherein, at the fixed blade and at the movable blade, the width from the recess portion to a blade tip of a blade tip front end face that contributes to cutting is from 1.2 mm to 1.5 mm.

9. A tape affixing apparatus that affixes adhesive tape to a package, comprising the guillotine cutter of claim 4, an adhesive tape feeding device that feeds adhesive tape toward the guillotine cutter, and a tape affixing device that affixes an adhesive tape cut by the guillotine cutter to a surface of the package.

10. The tape affixing apparatus according to claim 9, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

11. A tape affixing apparatus that affixes adhesive tape to a package, comprising the guillotine cutter of claim 3, an adhesive tape feeding device that feeds adhesive tape toward the guillotine cutter, and a tape affixing device that affixes an adhesive tape cut by the guillotine cutter to a surface of the package.

12. The tape affixing apparatus according to claim 11, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

13. The guillotine cutter according to claim 2, wherein the depth of the recess portion of the fixed blade and the movable blade is 0.5 mm or more.

14. The guillotine cutter according to claim 13, wherein, at the fixed blade and at the movable blade, the width from the recess portion to a blade tip of a blade tip front end face that contributes to cutting is from 0.5 mm to 1.5 mm.

15. A tape affixing apparatus that affixes adhesive tape to a package, comprising the guillotine cutter of claim 14, an adhesive tape feeding device that feeds adhesive tape toward the guillotine cutter, and a tape affixing device that affixes an adhesive tape cut by the guillotine cutter to a surface of the package.

16. The tape affixing apparatus according to claim 15, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

17. The guillotine cutter according to claim 13, wherein, at the fixed blade and at the movable blade, the width from the recess portion to a blade tip of a blade tip front end face that contributes to cutting is from 1.2 mm to 1.5 mm.

18. A tape affixing apparatus that affixes adhesive tape to a package, comprising the guillotine cutter of claim 13, an adhesive tape feeding device that feeds adhesive tape toward the guillotine cutter, and a tape affixing device that affixes an adhesive tape cut by the guillotine cutter to a surface of the package.

19. The tape affixing apparatus according to claim 18, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

20. A tape affixing apparatus that affixes adhesive tape to a package, comprising the guillotine cutter of claim 2, an adhesive tape feeding device that feeds adhesive tape toward the guillotine cutter, and a tape affixing device that affixes an adhesive tape cut by the guillotine cutter to a surface of the package.

21. The tape affixing apparatus according to claim 20, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

22. The guillotine cutter according to claim 1, wherein the depth of the recess portion of the fixed blade and the movable blade is 0.5 mm or more.

23. The guillotine cutter according to claim 22, wherein, at the fixed blade and at the movable blade, the width from the recess portion to a blade tip of a blade tip front end face that contributes to cutting is from 0.5 mm to 1.5 mm.

24. A tape affixing apparatus that affixes adhesive tape to a package, comprising the guillotine cutter of claim 23, an adhesive tape feeding device that feeds adhesive tape toward the guillotine cutter, and a tape affixing device that affixes an adhesive tape cut by the guillotine cutter to a surface of the package.

25. The tape affixing apparatus according to claim 24, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

26. The guillotine cutter according to claim 22, wherein, at the fixed blade and at the movable blade, the width from the recess portion to a blade tip of a blade tip front end face that contributes to cutting is from 1.2 mm to 1.5 mm.

27. A tape affixing apparatus that affixes adhesive tape to a package, comprising the guillotine cutter of claim 22, an adhesive tape feeding device that feeds adhesive tape toward the guillotine cutter, and a tape affixing device that affixes an adhesive tape cut by the guillotine cutter to a surface of the package.

28. The tape affixing apparatus according to claim 27, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

29. A tape affixing apparatus that affixes adhesive tape to a package, comprising the guillotine cutter of claim 1, an adhesive tape feeding device that feeds adhesive tape toward the guillotine cutter, and a tape affixing device that affixes an adhesive tape cut by the guillotine cutter to a surface of the package.

30. The tape affixing apparatus according to claim 29, wherein the adhesive tape affixing device comprises a tape end affixing portion that presses one end of the adhesive tape cut at the guillotine cutter against the package and affixes it thereto, and a tape wrap-around portion that wraps the adhesive tape, of which the one end has been affixed to the package by the tape end affixing portion, around the surface of the package.

31. The guillotine cutter according to claim 1, wherein the fixed blade comprises a first recess and the movable blade comprises a second recess, and the first and the second recesses are operable to increase a separation distance between the fixed blade and the movable blade after the tape-shaped object has been cut.

32. The guillotine cutter according to claim 31, wherein the separation distance is substantially along a lateral direction substantially perpendicular to a cutting plane of the fixed and the movable blades.

33. The guillotine cutter according to claim 31, wherein the separation distance is a distance from a bottom of the first recess to a bottom of the second recess when the first recess is facing the second recess.

34. The guillotine cutter according to claim 1, wherein the fixed blade comprises a first recess and the movable blade comprises a second recess, and the first and the second recesses are operable to increase a first separation distance between a cutting edge of the fixed blade and the movable blade and to increase a second separation distance between a cutting edge of the movable blade and the fixed blade, after the tape-shaped object has been cut.

35. The guillotine cutter according to claim 34, wherein the first and the second separation distances are along lateral directions.

36. The guillotine cutter of claim 1, wherein the blade tip is a first blade tip and the fixed blade includes a second blade tip which is V-shaped.

37. The guillotine cutter of claim 36, wherein a first plane formed by and parallel to the first blade tip of the movable blade is substantially parallel to a second plane formed by and parallel to the V-shaped second blade tip.

38. The guillotine cutter of claim 1, wherein the movable blade includes a first recess portion and the fixed blade includes a second recess portion, and each of the first and the second recess portions is open to the other of the first and the second recess portions.

39. A guillotine cutter, comprising:

a fixed blade and a movable blade that makes linear reciprocal motion while contacting against the fixed blade; wherein:

the movable blade and the fixed blade cooperate to cut a tape-shaped object for cutting in a widthwise direction, a surface of the fixed blade at a side that contacts the movable blade and a surface of the movable blade at a side that contacts the fixed blade are provided with a recess portion which is a concave portion that is rectangular-shaped and wider than the object for cutting, and the movable blade has a blade tip which is the only cutting edge of the movable blade, and the entire blade tip is straight.

40. The guillotine cutter of claim 39, wherein the movable blade includes a first recess portion and the fixed blade includes a second recess portion, and each of the first and the second recess portions is open to the other of the first and the second recess portions.

* * * * *